US010644571B2

(12) United States Patent
Hatch

(10) Patent No.: US 10,644,571 B2
(45) Date of Patent: May 5, 2020

(54) INTEGRATED DRIVE AND MOTOR ASSEMBLIES

(71) Applicant: Faraday&Future Inc., Gardena, CA (US)

(72) Inventor: Erik Hatch, Menifee, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 218 days.

(21) Appl. No.: 15/764,827

(22) PCT Filed: Sep. 23, 2016

(86) PCT No.: PCT/US2016/053493
§ 371 (c)(1),
(2) Date: Mar. 29, 2018

(87) PCT Pub. No.: WO2017/058664
PCT Pub. Date: Apr. 6, 2017

(65) Prior Publication Data
US 2018/0262089 A1   Sep. 13, 2018

Related U.S. Application Data

(60) Provisional application No. 62/234,551, filed on Sep. 29, 2015.

(51) Int. Cl.
*H02K 9/00* (2006.01)
*H02K 9/19* (2006.01)
(Continued)

(52) U.S. Cl.
CPC ................ *H02K 9/19* (2013.01); *B60L 50/50* (2019.02); *F16H 1/28* (2013.01); *F16H 57/031* (2013.01);
(Continued)

(58) Field of Classification Search
CPC . H02K 9/19; H02K 11/33; H02K 5/20; H02K 5/22; H02K 5/225; H02K 7/116;
(Continued)

(56) References Cited

U.S. PATENT DOCUMENTS

| 4,862,009 A * | 8/1989 | King | F02N 11/04 |
| | | | 290/22 |
| 7,775,060 B2 * | 8/2010 | Nakajima | H02K 11/33 |
| | | | 62/259.2 |

(Continued)

OTHER PUBLICATIONS

International Search Report dated Dec. 28, 2016 for International Application No. PCT/US2016/053493.

*Primary Examiner* — Thanh Lam

(57) ABSTRACT

Integrated drive and motor assemblies are described herein. An example integrated drive and motor assembly includes an electric motor having a winding that concentrically surrounds an input drive shaft, an inverter for delivering power to the electric motor, a gearbox assembly coupled to the input drive shaft and an output drive shaft, the gearbox assembly having a planetary gear that includes a plurality of helical gears that couple with the input drive shaft and a ring gear. The planetary gear also includes a carrier that is rotatably coupled to the plurality of helical gears and transfers rotational forces to the output drive shaft. The assembly includes a housing that encloses the electric motor, the gearbox assembly, and the output shaft in co-axial alignment with respect to a central axis.

20 Claims, 7 Drawing Sheets

(51) Int. Cl.

| | | |
|---|---|---|
| *H02K 7/116* | (2006.01) | |
| *H02K 5/22* | (2006.01) | |
| *H02K 11/33* | (2016.01) | |
| *F16H 57/04* | (2010.01) | |
| *B60L 50/50* | (2019.01) | |
| *F16H 1/28* | (2006.01) | |
| *F16H 57/031* | (2012.01) | |
| *H02K 5/20* | (2006.01) | |
| *F16H 57/02* | (2012.01) | |
| *H02K 1/30* | (2006.01) | |
| *F16H 57/021* | (2012.01) | |
| *F16H 57/08* | (2006.01) | |

(52) U.S. Cl.
CPC ..... *F16H 57/0417* (2013.01); *F16H 57/0476* (2013.01); *F16H 57/0486* (2013.01); *H02K 5/20* (2013.01); *H02K 5/225* (2013.01); *H02K 7/116* (2013.01); *H02K 11/33* (2016.01); *F16H 57/0424* (2013.01); *F16H 57/0452* (2013.01); *F16H 57/08* (2013.01); *F16H 2057/0216* (2013.01); *F16H 2057/02034* (2013.01); *F16H 2057/02043* (2013.01); *H02K 1/30* (2013.01)

(58) Field of Classification Search
CPC ...... H02K 7/1163; H02K 7/1166; F16H 1/28; F16H 57/0476; F16H 57/0424
USPC ................. 310/52–59, 68 D, 71, 83, 98–99
See application file for complete search history.

(56) References Cited

U.S. PATENT DOCUMENTS

| | | | |
|---|---|---|---|
| 8,348,008 B2* | 1/2013 | Yamaguchi | B62D 5/0406 180/444 |
| 10,253,848 B2* | 4/2019 | Hatch | F16H 1/28 |
| 2004/0108778 A1 | 6/2004 | Tsukamoto et al. | |
| 2005/0143210 A1 | 6/2005 | Hamai et al. | |
| 2006/0108884 A1* | 5/2006 | Shiino | B60T 8/267 310/89 |
| 2011/0169353 A1* | 7/2011 | Endo | H02K 1/32 310/59 |
| 2013/0088109 A1 | 4/2013 | Frait et al. | |
| 2014/0285045 A1* | 9/2014 | Obata | H02K 7/116 310/83 |
| 2015/0083505 A1 | 3/2015 | Pearce, Jr. et al. | |
| 2015/0224884 A1 | 8/2015 | Rawlinson | |
| 2018/0006522 A1* | 1/2018 | Hiramitsu | H02K 3/50 |
| 2018/0162377 A1* | 6/2018 | Colavincenzo | B60K 6/387 |

* cited by examiner

INTEGRATED DRIVE AND MOTOR ASSEMBLIES

CROSS-REFERENCE TO RELATED APPLICATIONS

This application is a National Phase application under 35 U.S.C. § 371 of International Application No. PCT/US2016/053493, filed Sep. 23, 2016, which claims the priority benefit of U.S. Provisional Application No. 62/234,551, filed Sep. 29, 2015, the contents of which are hereby incorporated by reference in their entireties for all intended purposes.

FIELD

The present disclosure relates generally to drive and motor assemblies. More specifically to incorporating drive and motor components together for an electric vehicle.

SUMMARY

According to some embodiments, the present disclosure may be directed to an integrated drive and motor assembly for a motor vehicle, the integrated drive and motor assembly comprising: (a) an electric motor; (b) an inverter for delivering power to the electric motor; (c) a gearbox assembly coupled to the electric motor; (d) an output shaft coupled to the gearbox assembly; and (e) a housing comprising: (i) a central section that retains the electric motor, the gearbox assembly, and the output shaft in co-axial relationship to one with respect to a central axis; (ii) a lower reservoir disposed on a bottom end of the central section; and (iii) an inverter enclosure extending from a sidewall of the central section, the inverter enclosure configured to receive the inverter.

According to some embodiments, the present disclosure may be directed to an integrated drive and motor assembly for a motor vehicle, the integrated drive and motor assembly comprising: (a) an electric motor; (b) an inverter for delivering power to the electric motor; (c) a gearbox assembly rotatably coupled to the electric motor; (d) an output shaft coupled to the gearbox assembly; and (e) a housing comprising: (i) a cylindrical section that retains the electric motor, the gearbox assembly, and the output shaft in co-axial relationship to one another along a central axis; (ii) a lower reservoir disposed on a bottom end of the cylindrical section, the lower reservoir comprising a lubricant for the electric motor and gearbox assembly; and (iii) an inverter enclosure extending from a sidewall of the cylindrical section, the inverter enclosure configured to receive the inverter, the inverter enclosure comprising an interior portion that comprises a coolant for cooling the inverter.

According to some embodiments, the present disclosure may be directed to an integrated drive and motor assembly for a motor vehicle, the integrated drive and motor assembly comprising: (a) an electric motor having a winding that concentrically surrounds an input drive shaft; (b) an inverter for delivering power to the electric motor; (c) a gearbox assembly coupled to the input drive shaft and an output drive shaft, the gearbox assembly comprising a planetary gear that comprises a plurality of helical gears that couple with the input drive shaft and a ring gear, the planetary gear also comprising a carrier that is rotatably coupled to the plurality of helical gears and transfers rotational forces to the output drive shaft; and (d) a housing that encloses the electric motor, the gearbox assembly, and the output shaft in co-axial alignment with respect to a central axis.

BRIEF DESCRIPTION OF THE DRAWINGS

Certain embodiments of the present disclosure are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
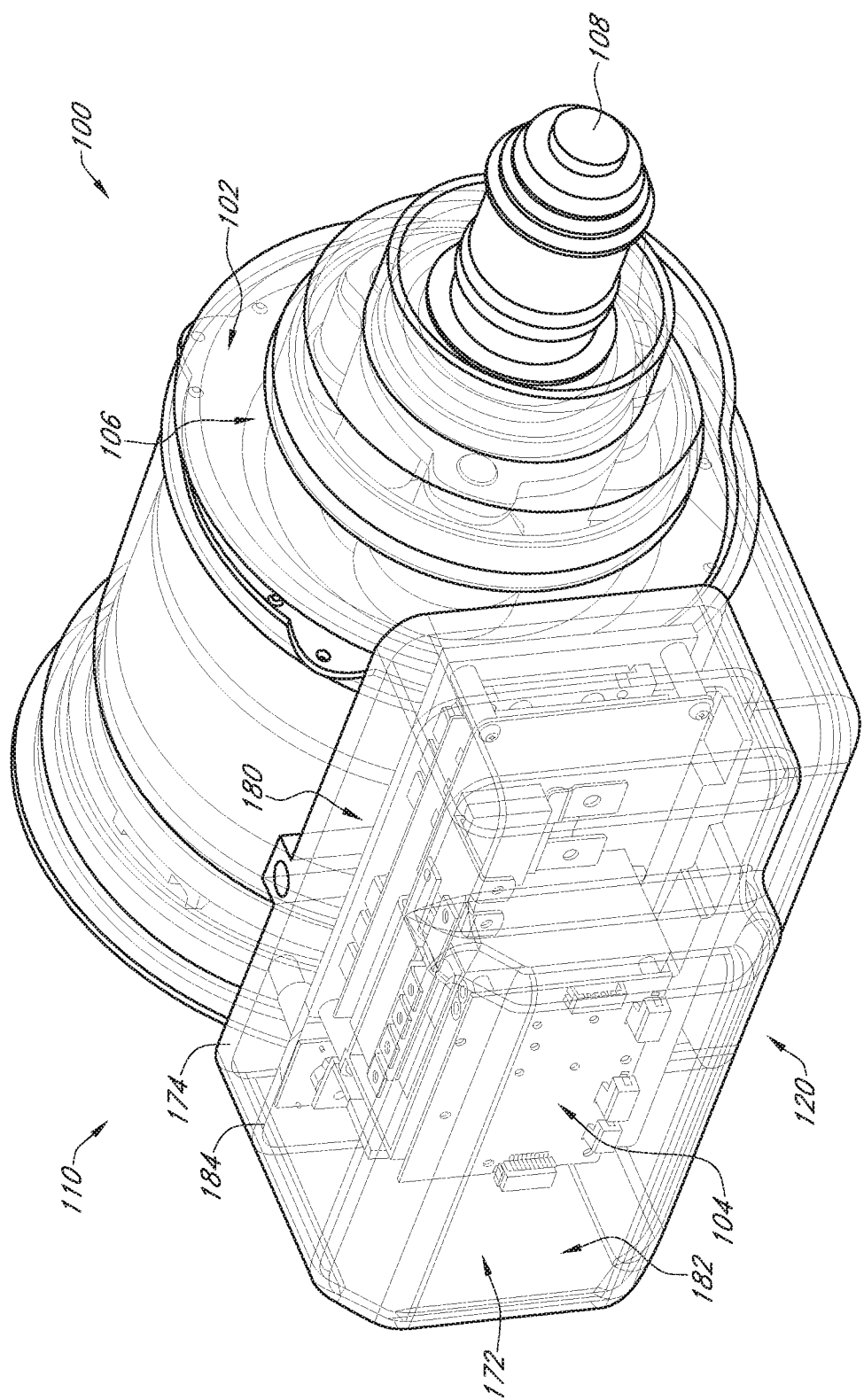
FIG. 1 is a perspective view of an example integrated assembly that comprises both motor and drive components for an electric vehicle.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

For context, conventional electric vehicles include an electric motor, gearbox, and inverter, which are packaged/housed separately from one another. In particular, the inverter is connected to the motor through electric wires. These electric wires are the source of electromagnetic interference (EMI), which can cause deleterious effects within the system such as reduced motor performance.

Typical electric vehicles comprise a gearbox and an electric motor that are offset from one another (e.g., not co-axially oriented with one another). Thus, their axes are coupled through gearsets, which are also not in co-axial alignment with the gearbox and electric motor. These configurations are inefficient, bulky, and difficult to be integrated into the vehicle platform.

Advantageously, the present disclosure describes integrated drive and motor assemblies that can combine an electric motor, gearbox, inverter system into a common package (e.g., housing) for improved vehicle packaging and efficiency. In some embodiments, the electric motor and gearbox may be disposed in a co-axial relationship with one another and with a central axis of the assembly. In more detail, in some embodiments, a motor winding, an output shaft, and a gearbox may be arranged co-axially within the housing.

Packaging the inverter with the motor, as contemplated and described in the present disclosure, reduces losses often caused by interconnecting cables and the number of connections. This close/direct coupling can also reduce noise in the signal harnesses between the motor and inverter. An EMI signature may be reduced by eliminating the power cable transmission of EMI to the surroundings and the shielding provided by the housing.

Integrating the motor and gearbox closely may function to reduce part count (e.g., component costs) and reduce an overall mass of the system by reducing any need for additional housings and sharing functions as much as reasonable.

Integration of two separate cooling systems is also described herein. The inverter shares a cooling compartment with the motor and gearbox housing, which allows interconnection of the cooling compartment from the inverter to a motor/gearbox heat exchanger. This integration can reduce the number of coolant connections and potential leak points. Further, tighter integration between these cooling features reduces pump sizing and losses in piping.

The integrated assemblies of the present disclosure improve electric vehicle design when the motor is installed on the vehicle chassis (e.g., the underbody). Compared with designs where an axis of the gearbox is offset from an axis of the motor shaft, integrated assemblies of the present disclosure reduce off-axis weight and unnecessary components that would ordinarily couple these components.

These and other advantages of the present technology are provided herein and will be discussed in greater detail relative to the collective drawings FIGS. 1-7.

FIG. 1 illustrates an example integrated drive and motor assembly, hereinafter "assembly 100". The assembly 100 generally comprises an electric motor 102, an inverter 104 for delivering power to the electric motor 102, a gearbox assembly 106 coupled to the electric motor 102, an output shaft 108 coupled to the gearbox assembly 106, and a housing 110. To be sure, the housing 110 encloses each of aforementioned components of the assembly 100.

Figure 2:
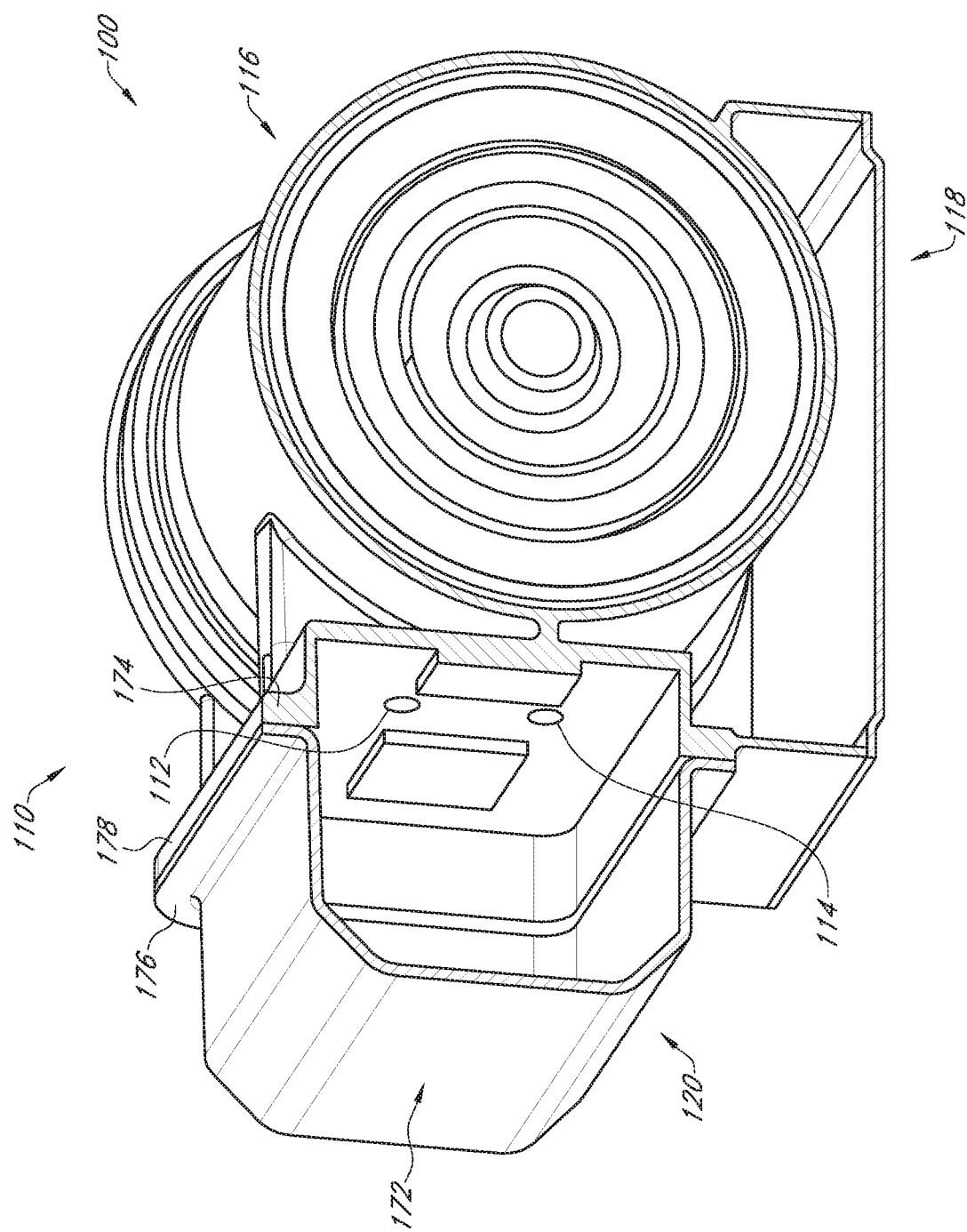
FIG. 2 is a perspective cross section view of the example integrated assembly of FIG. 1

Referring now to FIG. 2, which illustrates the assembly 100 with the inverter removed so as to illustrate an input path 112 and an output path 114 that can allow for circulation of coolant within an inverter enclosure of the housing 110 as will be described in greater detail below.

According to some embodiments, the housing 110 may comprise a cylindrical or central section 116, a lower reservoir 118, and an inverter enclosure 120. In some embodiments, the lower reservoir 118 and inverter enclosure 120 can be disposed perpendicularly to one another.

Figure 3:
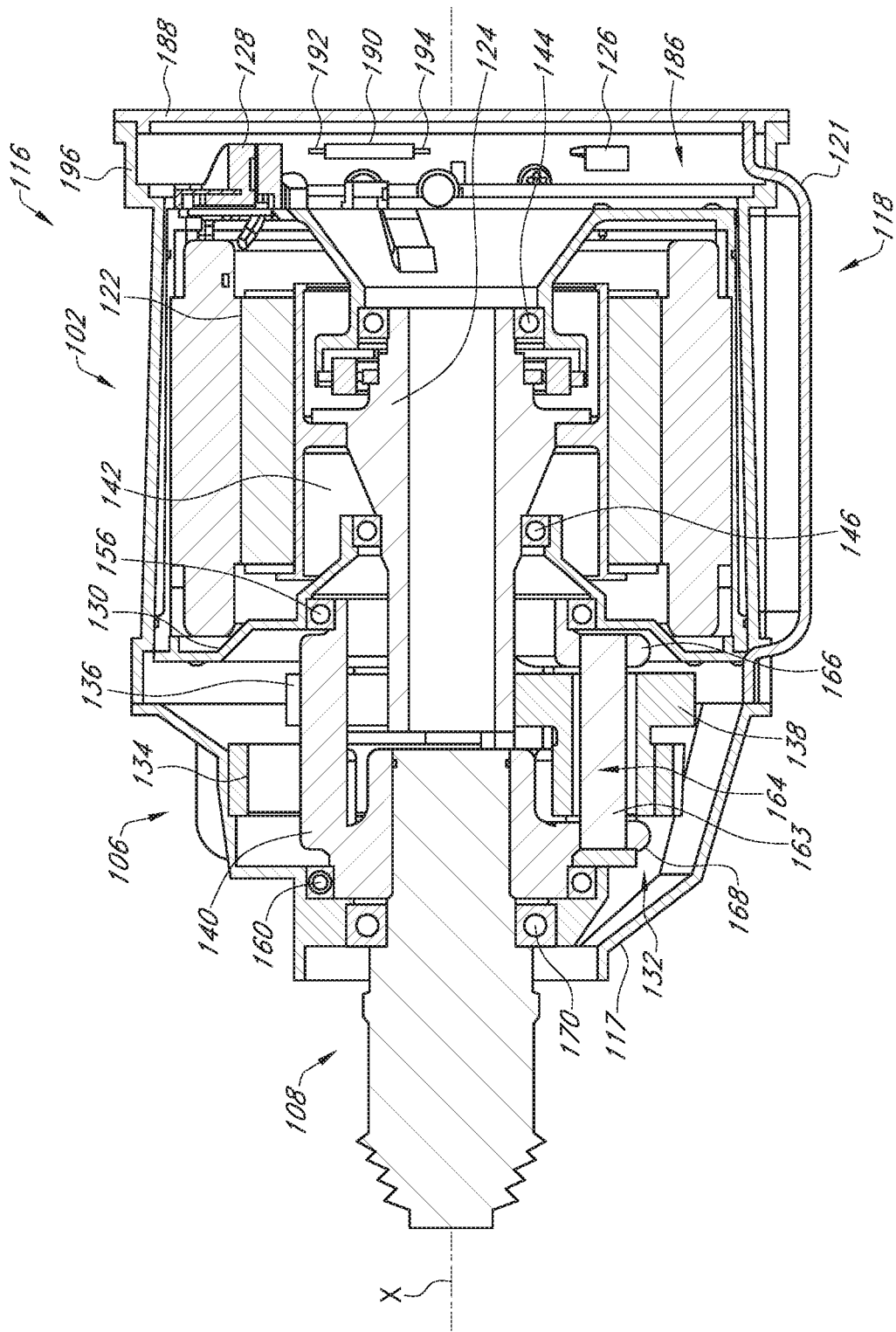
FIG. 3 is a cross-sectional view side view of the example integrated assembly.

As best illustrated in FIG. 3, the cylindrical section 116 may be configured to receive and retain the electric motor 102, the gearbox assembly 106, and a portion of the output shaft 108. These components are disposed in co-axial relationship with one another, as well as a central axis X, which extends through the cylindrical section 116.

To be sure, a terminal end of the output shaft 108 can extend outside of the cylindrical section 116 of the housing 110. The output shaft 108 can couple with a drive train of the electric vehicle (not shown).

The electric motor 102 comprises a winding 122 that is disposed concentrically (an in co-axial alignment) around a motor shaft 124. As is illustrated and described with reference to FIG. 7, the electric motor 102 and inverter 104 are directly electrically coupled to one another. This direct coupling can eliminate the need for electrical cables between the inverter 104 and the electric motor 102. As mentioned above, this direct coupling reduces EMI that would ordinarily be generated by electrical cables that couple the electric motor 102 and inverter 104.

Figure 7:
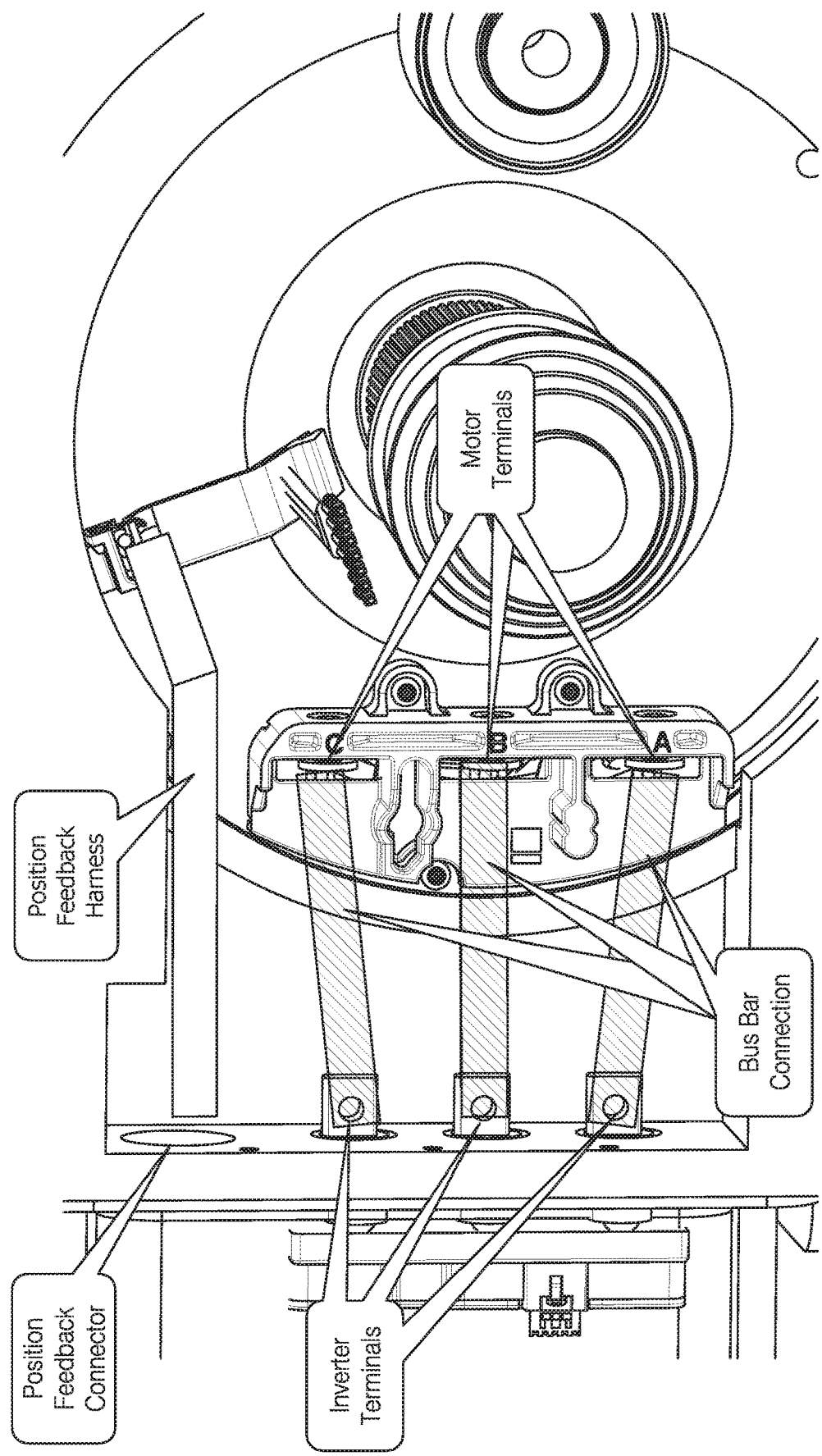
FIG. 7 illustrates an example direct electrical connection between an electric motor and inverter of the example integrated assembly.

In one embodiment, the inverter 104 comprises a three phase, symmetrical bus bar 105 that directly connects to electrical contacts of the electric motor 102, as illustrated and described in greater detail with reference to FIG. 7.

The lower reservoir 118 is disposed on a bottom end of the cylindrical section 116. The lower reservoir 118 is formed from a pan 121 that is joined to the bottom end of the cylindrical section 116. The lower reservoir 118 is configured to receive a lubricant such as a transmission fluid or other suitable lubricant that is used to lubricate the electric motor 102 and the gearbox assembly 106.

In some embodiments, a pump 126 may be utilized to pump the lubricant into the cylindrical section 116 through an input port 128. The lubricant can be drawn by gravity into the lower reservoir 118 once it has passed through the cylindrical section 116. The pump 126 can continually recirculate the lubricant back through the cylindrical section 116.

The gearbox assembly 106 is illustrated as interfacing with the motor shaft 124 and the output shaft 108. The gearbox assembly 106 may comprise a housing bracket 130 and a planetary gear assembly 132. The planetary gear assembly 132 can, in some embodiments, comprise a ring gear 134, a plurality of helical gears (of which only two are illustrated in FIG. 3) such as, for example, helical gear 136 and helical gear 138, and an output drive shaft carrier 140. In one embodiment, the planetary gear assembly 132 can comprise three helical gears that are each identical to one another.

The motor shaft 124 imparts torque forces (e.g., rotational) onto the planetary gear assembly 132 in order to rotate the output shaft 108. In some embodiments, the motor shaft 124 can be rotatingly supported within a drive shaft sleeve 142 using a pair of thrust bearings 144 and 146. The thrust bearing 146 may be coupled with the housing bracket 130 in some embodiments.

To be sure, the various thrust bearings and housing bracket 130 function to retain the various components of the assembly 100, such as the motor shaft 124, planetary gear assembly 132, and output shaft 108 in co-axial alignment with the central axis X of the cylindrical section 116.

Figure 4:
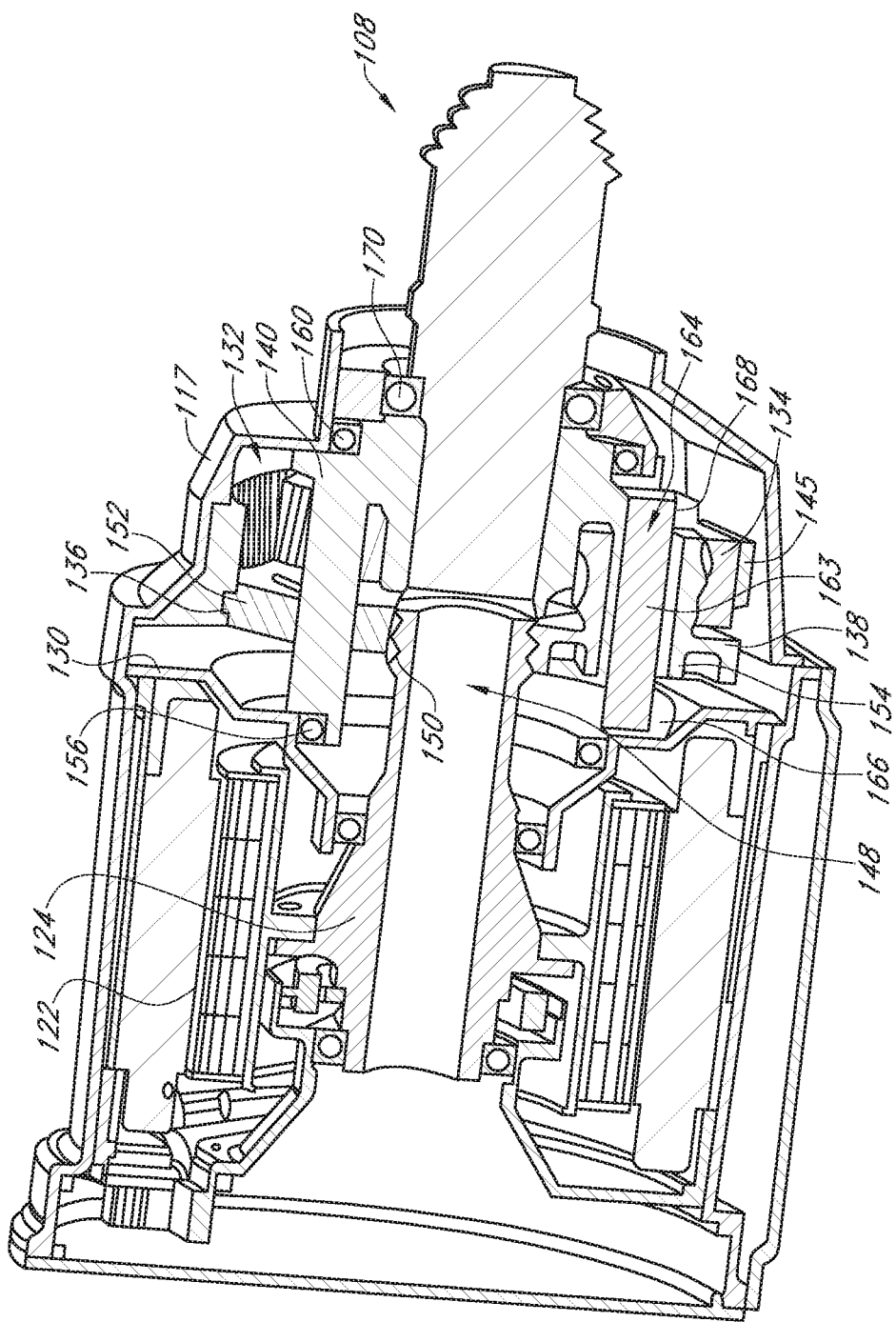
FIG. 4 is a perspective, cross-sectional view of the example assembly of FIG. 3.

Specifically, in FIG. 4, the motor shaft 124 can include a terminal end 148 that comprises threads 150 that create a helical pattern that may be configured to mate with threads 152 of the helical gear 136 and threads 154 of the helical gear 138.

Figure 5:
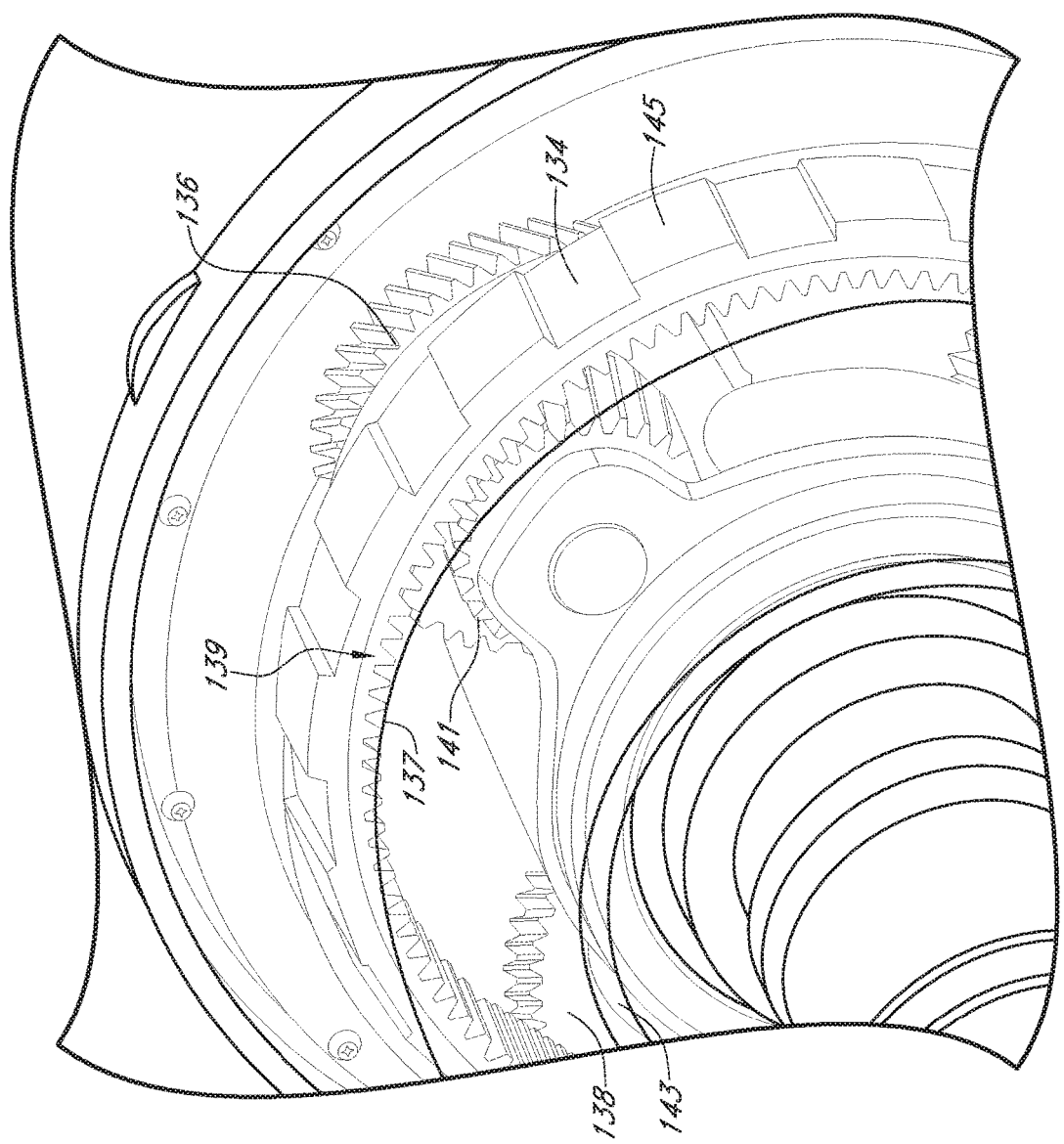
FIG. 5 is a close up view of a planetary gear assembly of the present disclosure.

In FIG. 5, the ring gear 134 can comprise threads 137 on an inner sidewall 139 that mate with threads 141 of the helical gear 136 and threads 143 of the helical gear 138. An outer sidewall 145 of the ring gear 134 contacts a cover 117 of the cylindrical section 116 to fixedly position the ring gear 134, as illustrated in FIG. 4.

According to some embodiments, the housing bracket 130 supports both the motor shaft 124 and the output drive shaft carrier 140. The output drive shaft carrier 140 is concentrically disposed around the motor shaft 124 and output shaft 108.

In some embodiments, the output drive shaft carrier 140 rotates around the motor shaft 124 and output shaft 108. The output drive shaft carrier 140 can be rotatingly supported on one end by the housing bracket 130 with a thrust bearing 156 and on an opposing end of the cover 117 with a thrust bearing 160.

In FIG. 3, the output drive shaft carrier 140 comprises an arm, such as arm 163 for each of the helical gears of the planetary gear assembly 132. In one embodiment, the arm 163 comprises a shaft 164 supported on either end of the output drive shaft carrier 140 by armature supports 166 and 168. The shaft 164 can freely rotate within the armature supports 166 and 168 in some embodiments.

The output shaft 108 is coupled directly to the output drive shaft carrier 140 such that rotation of the output drive shaft carrier 140 by the helical gears of the planetary gear assembly 132 causes rotation of the output shaft 108. In some embodiments, the output shaft 108 can be rotatingly supported at an outer opening of the cylindrical section 116 of the housing 110 with a thrust bearing 170.

Referring back to FIG. 2, the inverter enclosure 120 is illustrated. The inverter enclosure 120 can comprise a cover section 172 and a mounted section 174. The mounted section 174 may be integrated into a sidewall of the cylindrical section 116 of the housing 110. The cover section 172 can mate with the mounted section 174 across flanges 176 and 178.

Figure 6:
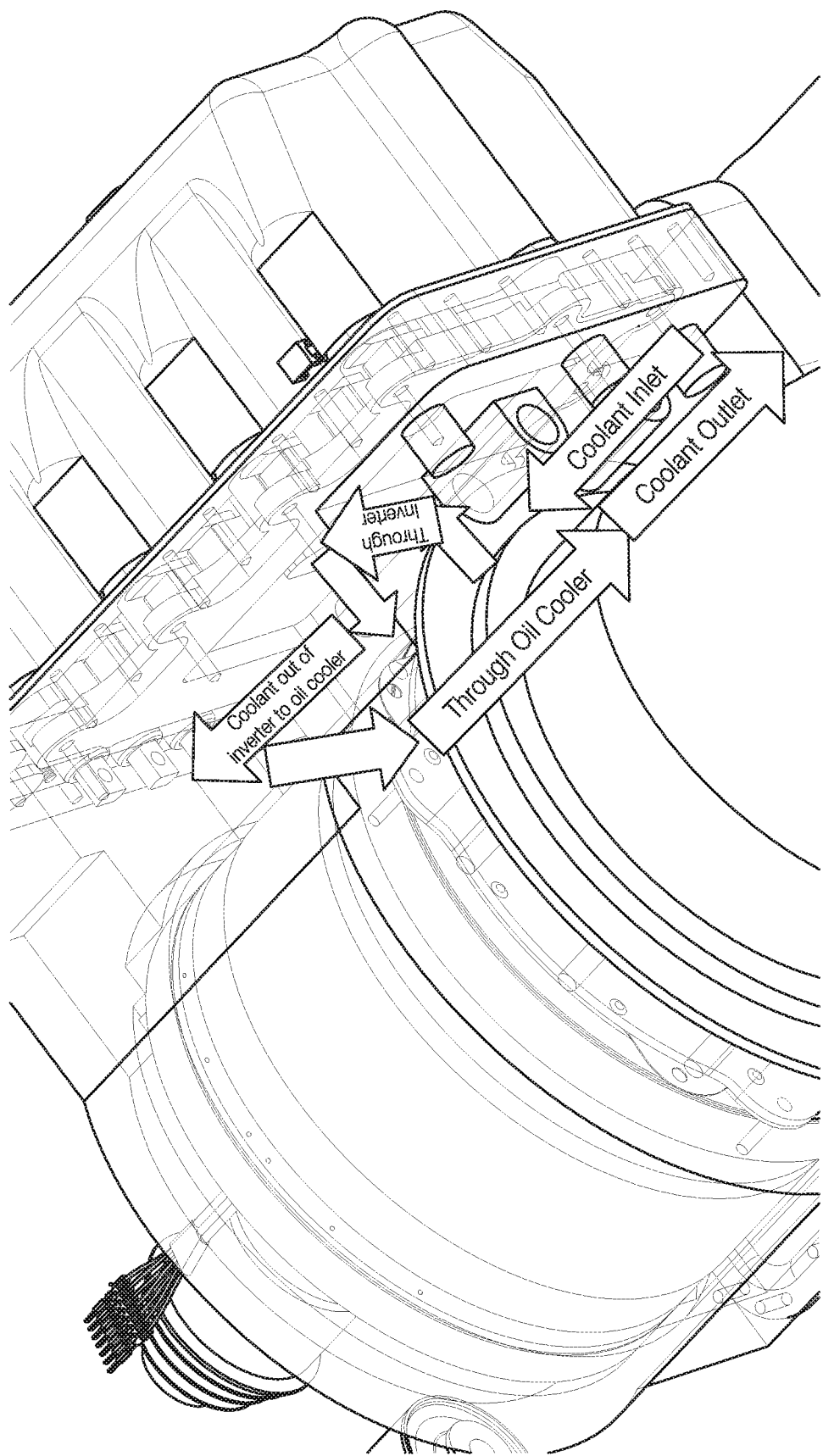
FIG. 6 illustrates an example cooling chamber of the example integrated assembly of FIGS. 1-5.

Referring to FIGS. 1, 3, and 6 collectively, the input path 112 and an output path 114 are provided for allowing the assembly to circulate coolant around a lower section of the inverter 104 (see FIG. 6). In more detail, FIG. 1 illustrates the inverter 104 can be installed within the inverter enclosure 120. The inverter enclosure 120 can be divided into an interior portion 180 and a distal portion 182 using a dividing wall 184. The inverter 104 may be sealingly mounted to the dividing wall 184 using a seal or ring that creates a fluid impermeable barrier between the interior portion 180 and the distal portion 182 of the inverter enclosure 120. According to some embodiments, heat sinks can be provided for the inverter 104 that can extend into the interior portion 180 of the inverter enclosure 120 and may be exposed to the coolant that circulates within the interior portion 180.

In some embodiments, housing 110 can comprise a cooling compartment 186 formed by a rearward opening of the housing enclosed with a cover plate 188. For example, the cylindrical section 116 can include a flange 196 that cooperates with the cover plate 188 in the cooling compartment 186.

The cooling compartment 186 can comprise a heat exchanger and a pump.

In some embodiments, the heat exchanger 190 can be configured to thermally process both the coolant circulated through the inverter enclosure 120 and the lubricant circulated through the cylindrical section 116 of the housing 110.

The pump 126 can be coupled with the heat exchanger 190 and may be utilized to circulate the coolant within the inverter enclosure 120 and the lubricant within the cylindrical section 116 of the housing 110. The pump 126 may also circulate both the coolant and the lubricant through the heat exchanger 190. Thus, the heat exchanger comprises a coolant interface 192 and a lubricant interface 194 that receive and output their respective fluids.

In some embodiments, all components can be packaged within the motor/gearbox/inverter and can have only coolant connected from the outside.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. An integrated drive and motor assembly for a motor vehicle, the integrated drive and motor assembly comprising:
   an electric motor;
   an inverter for delivering power to the electric motor;
   a gearbox assembly coupled to the electric motor;
   an output shaft coupled to the gearbox assembly; and
   a housing comprising:
      a central section that retains the electric motor, the gearbox assembly, and
      the output shaft in co-axial relationship to one with respect to a central axis;
      a lower reservoir disposed on a bottom end of the central section; and
      an inverter enclosure extending from a sidewall of the central section, the inverter enclosure configured to receive the inverter.

2. The integrated drive and motor assembly according to claim 1, wherein the electric motor comprises a motor winding that is concentric to an input driveshaft of the electric motor.

3. The integrated drive and motor assembly according to claim 2, wherein the gearbox assembly comprises a planetary gear that comprises a plurality of helical gears that transfer rotational forces from the input drive shaft of the electric motor to the output shaft.

4. The integrated drive and motor assembly according to claim 3, wherein the gearbox assembly further comprises a ring gear that is fixedly coupled with a cover of the central section.

5. The integrated drive and motor assembly according to claim 4, wherein the electric motor is directly electrically coupled with the inverter by a three phase bus bar of the inverter.

6. The integrated drive and motor assembly according to claim 5, wherein the central section comprises a cooling compartment formed by a rearward opening of the housing enclosed with a cover plate.

7. The integrated drive and motor assembly according to claim 6, wherein an interior portion of the inverter enclosure is in fluid communication with a cooling cavity of the central section using an inlet path and an outlet path.

8. The integrated drive and motor assembly according to claim 7, further comprising a coolant interface and a lubricant interface.

9. The integrated drive and motor assembly according to claim 8, further comprising a heat exchanger that thermally processes a lubricant circulated through the electric motor and the gearbox, wherein the lubricant collects within the lower reservoir, and wherein the heat exchanger thermally processes a coolant that circulates through the inverter enclosure.

10. The integrated drive and motor assembly according to claim 9, wherein the lubricant is circulated using the lubricant interface and the coolant through the inverter enclosure using the coolant interface.

11. An integrated drive and motor assembly for a motor vehicle, the integrated drive and motor assembly comprising:
   an electric motor;
   an inverter for delivering power to the electric motor;
   a gearbox assembly rotatably coupled to the electric motor;
   an output shaft coupled to the gearbox assembly; and
   a housing comprising:
      a cylindrical section that retains the electric motor, the gearbox assembly, and the output shaft in co-axial relationship to one another along a central axis;
      a lower reservoir disposed on a bottom end of the cylindrical section, the lower reservoir comprising a lubricant for the electric motor and gearbox assembly; and
      an inverter enclosure extending from a sidewall of the cylindrical section, the inverter enclosure configured to receive the inverter, the inverter enclosure comprising an interior portion that comprises a coolant for cooling the inverter.

12. The integrated drive and motor assembly according to claim 11, wherein the lower reservoir is disposed perpendicularly to the inverter enclosure.

13. The integrated drive and motor assembly according to claim 12, wherein the lower reservoir and the interior portion of the inverter enclosure are in fluid communication with a cooling compartment disposed rearwardly of the cylindrical section.

14. The integrated drive and motor assembly according to claim 13, wherein a distal portion of the inverter enclosure is sealed to prevent the coolant from entering the distal portion.

15. The integrated drive and motor assembly according to claim 14, wherein the interior portion and the distal portion are separated by a dividing wall.

16. An integrated drive and motor assembly for a motor vehicle, the integrated drive and motor assembly comprising:
   an electric motor having a winding that concentrically surrounds an input drive shaft;
   an inverter for delivering power to the electric motor;
   a gearbox assembly coupled to the input drive shaft and an output drive shaft, the gearbox assembly comprising a planetary gear that comprises a plurality of helical gears that couple with the input drive shaft and a ring gear, the planetary gear also comprising a carrier that is rotatably coupled to the plurality of helical gears and transfers rotational forces to the output drive shaft; and
   a housing that encloses the electric motor, the gearbox assembly, and the output shaft in co-axial alignment with respect to a central axis.

17. The integrated drive and motor assembly according to claim 16, wherein the electric motor is directly electrically coupled with the inverter by symmetrical output tabs of a three phase bus bar of the inverter.

18. The integrated drive and motor assembly according to claim 17, wherein the housing comprises a cooling compartment formed by a rearward opening of the housing, which is enclosed with a cover plate.

19. The integrated drive and motor assembly according to claim 18, wherein an interior portion of the inverter enclosure is in fluid communication with a cooling cavity of the central section using an inlet path and an outlet path.

20. The integrated drive and motor assembly according to claim 19, wherein a transmission fluid is circulated within the housing and a coolant is circulated within an inverter enclosure of the housing.

* * * * *